(12) United States Patent
Ottosson

(10) Patent No.: US 9,375,797 B2
(45) Date of Patent: Jun. 28, 2016

(54) FILING FIXTURE

(75) Inventor: Magnus Ottosson, Norrahammar (SE)

(73) Assignee: HUSQVARNA AB, Huskvarna (SE)

(*) Notice: Subject to any disclaimer, the term of this patent is extended or adjusted under 35 U.S.C. 154(b) by 0 days.

(21) Appl. No.: 14/397,738

(22) PCT Filed: May 11, 2012

(86) PCT No.: PCT/EP2012/058748
§ 371 (c)(1),
(2), (4) Date: Oct. 29, 2014

(87) PCT Pub. No.: WO2013/167195
PCT Pub. Date: Nov. 14, 2013

(65) Prior Publication Data
US 2015/0086281 A1    Mar. 26, 2015

(51) Int. Cl.
B23D 63/16    (2006.01)
(52) U.S. Cl.
CPC ............ B23D 63/162 (2013.01); B23D 63/166 (2013.01); *Y10T 407/1825* (2015.01)
(58) Field of Classification Search
CPC .... B23D 63/16; B23D 63/162; B23D 63/164; B23D 63/166
USPC .......... 76/31, 36, 80.5; 33/202; D8/71, 90, 91
See application file for complete search history.

(56) References Cited

U.S. PATENT DOCUMENTS

| | | | | | |
|---|---|---|---|---|---|
| 1,572,013 | A * | 2/1926 | Hilton | ................. | B23D 63/001 76/31 |
| 1,740,019 | A * | 12/1929 | Jeter | ..................... | B23D 63/10 76/31 |
| 1,900,084 | A * | 3/1933 | Waller | ................. | B23D 63/001 76/31 |
| 2,078,399 | A * | 4/1937 | Marsh et al. | ........... | B23D 63/02 76/31 |
| 2,171,169 | A * | 8/1939 | Woodbury | ........... | B23D 63/001 76/31 |
| 2,421,657 | A * | 6/1947 | Speed | ................. | B23D 63/001 76/36 |
| 2,485,389 | A * | 10/1949 | La Clair | ............... | B23D 63/001 76/36 |
| 2,679,110 | A * | 5/1954 | McIntyre | ............. | B23D 63/001 76/36 |

(Continued)

FOREIGN PATENT DOCUMENTS

DE    2503360 A1 *    7/1976
EP    2357053 A2    8/2011

(Continued)

OTHER PUBLICATIONS

"Combination File Guide," printed Aug. 4, 2011 from http://www.jackssmallengines.com/chaintoolfile.cfm, all enclosed pages cited.

(Continued)

*Primary Examiner* — Jason Daniel Prone
(74) *Attorney, Agent, or Firm* — Nelson Mullins Riley & Scarborough LLP

(57) ABSTRACT

A fixture configured to file a chain of a chain saw. The fixture includes at least one pair of flanges, wherein each of the flanges has a first end and a second end. Further, a first connecting portion connects the flanges at their first ends, and a second connecting portion connects the flanges at their second ends. Further, the first connecting portion includes a pair of counter holds configured to provide area contact with a guide bar of the chain saw. The fixture also includes a cam portion pivotally coupled to the second connecting portion, wherein the cam portion and at least one of the counter holds simultaneously secure the fixture to the guide bar.

8 Claims, 3 Drawing Sheets

(56) References Cited

U.S. PATENT DOCUMENTS

| | | | | |
|---|---|---|---|---|
| 2,737,830 | A * | 3/1956 | Siverson et al. | B23D 63/162 76/31 |
| 2,817,252 | A * | 12/1957 | Simmons | B23D 63/162 76/36 |
| 2,871,728 | A * | 2/1959 | Tremblay | B23D 63/162 76/31 |
| 2,898,782 | A * | 8/1959 | Consoletti | B23D 63/162 76/36 |
| 3,055,238 | A * | 9/1962 | Hazzard | B23D 63/162 76/36 |
| 3,060,768 | A * | 10/1962 | Tremblay | B23D 63/162 76/36 |
| 3,071,987 | A * | 1/1963 | Kopare | B23D 63/162 76/36 |
| 3,083,591 | A | 4/1963 | Travis | |
| 3,091,136 | A * | 5/1963 | Maier | B23D 63/162 76/36 |
| 3,166,956 | A * | 1/1965 | Watro | B23D 63/10 76/36 |
| 3,172,306 | A | 3/1965 | Kephart, Jr. | |
| 3,322,000 | A | 5/1967 | Newman | |
| 3,365,805 | A * | 1/1968 | Carlton | B23D 63/162 76/31 |
| 3,407,466 | A * | 10/1968 | Granberg | B23D 63/162 76/36 |
| 3,438,286 | A * | 4/1969 | Silvon | B23D 63/162 76/80.5 |
| 3,494,228 | A * | 2/1970 | Sim | B23D 63/162 76/36 |
| 3,670,600 | A * | 6/1972 | Arff | B23D 63/162 76/36 |
| 3,744,349 | A * | 7/1973 | Juncker | B23D 63/162 76/31 |
| 3,796,113 | A * | 3/1974 | Granberg | B23D 63/16 76/80.5 |
| 3,901,105 | A * | 8/1975 | Ayer | B23D 63/162 76/36 |
| 3,905,118 | A * | 9/1975 | Ballew | B23D 63/162 76/80.5 |
| 3,942,255 | A * | 3/1976 | Bakoledis | B23D 63/162 76/36 |
| 4,010,661 | A * | 3/1977 | Fletcher | B23D 63/162 76/36 |
| 4,109,900 | A * | 8/1978 | Vandecoevering | B23D 63/162 269/102 |
| 4,131,038 | A | 12/1978 | Beerens | |
| 4,173,908 | A * | 11/1979 | Aksamit | B23D 63/162 76/36 |
| 4,177,697 | A * | 12/1979 | McDunn | B23D 63/162 76/36 |
| D256,426 | S | 8/1980 | Aksamit | D8/71 |
| 4,228,702 | A | 10/1980 | Stewart et al. | |
| 4,277,987 | A * | 7/1981 | Hyde | B23D 63/162 76/80.5 |
| 4,404,871 | A * | 9/1983 | Fritz | B23D 63/162 76/36 |
| 4,404,872 | A * | 9/1983 | Fritz | B23D 63/162 76/36 |
| D271,276 | S * | 11/1983 | Reynolds | D8/91 |
| 4,412,463 | A | 11/1983 | Beerens | |
| RE31,504 | E * | 1/1984 | Aksamit | B23D 63/162 76/36 |
| 4,429,596 | A * | 2/1984 | Southard | B23D 63/162 76/36 |
| 4,435,999 | A | 3/1984 | Beerens | |
| 4,438,667 | A | 3/1984 | Hannah | |
| 4,440,045 | A * | 4/1984 | Aksamit | B23D 63/162 76/36 |
| 4,463,630 | A * | 8/1984 | Turner | B23D 63/166 76/80.5 |
| 4,594,919 | A * | 6/1986 | Southard | B23D 63/162 76/36 |
| D285,899 | S | 9/1986 | Bohman et al. | |
| 4,719,823 | A * | 1/1988 | Pyle | B23D 63/162 76/36 |
| 4,864,897 | A * | 9/1989 | Newman | B23D 63/162 76/31 |
| 5,107,726 | A * | 4/1992 | Wilhite | B23D 63/162 76/36 |
| 5,142,946 | A * | 9/1992 | Fappas, Jr. | B23D 63/14 76/37 |
| 5,241,882 | A | 9/1993 | Eriksson | |
| 5,730,032 | A * | 3/1998 | Kraft | B23D 63/02 76/63 |
| 5,983,755 | A * | 11/1999 | Juncker | B23D 63/162 76/80.5 |
| 6,742,403 | B2 * | 6/2004 | Thomas | B25B 1/2405 76/112 |
| 7,320,635 | B2 * | 1/2008 | Cendak | B23D 63/166 76/40 |
| 7,566,191 | B2 * | 7/2009 | Hooser | B23D 63/162 76/25.1 |
| 7,900,536 | B2 * | 3/2011 | Hensley | B23D 63/168 76/80.5 |
| 2006/0137489 | A1 * | 6/2006 | Nishigaki | B23D 63/162 76/80.5 |
| 2012/0285296 | A1 * | 11/2012 | Foehrenbach | B23D 63/162 76/80.5 |
| 2015/0113818 | A1 * | 4/2015 | Sohlman | B23D 63/162 33/202 |

FOREIGN PATENT DOCUMENTS

| | | | |
|---|---|---|---|
| FR | 2812574 A1 * | 2/2002 | |
| WO | WO 8101379 A1 * | 5/1981 | |
| WO | WO 2013167195 A1 * | 11/2013 | |

OTHER PUBLICATIONS

"Sharpening a Chainsaw," printed Aug. 4, 2011 from http://www.permies.conn/permaculture-forums/6557_0/woodland-care/sharpening-a-chainsaw, all enclosed pages cited.

International Search Report and Written Opinion of PCT/EP2012/058748 mailed Jan. 23, 2013, all enclosed pages cited.

Chapter II International Preliminary Report on Patentability of PCT/EP2012/058748 mailed Apr. 30, 2014, all enclosed pages cited.

* cited by examiner

FILING FIXTURE

TECHNICAL FIELD

The present invention relates in general to sharpening a chain of a chain saw, and in particular, to a filing fixture guide for aiding manual filing of the chain of the chain saw.

BACKGROUND

Cutting links of a chain in a chain saw dull at an unpredictable rate depending on various parameters. For example, the type of wood, the moisture content of the wood, and the force exerted by the operator of the chain saw, etc. may be some variables determining the rate at which the cutting links dull. A chain saw with dull cutting links not only cuts slowly but can be a safety hazard to the operator due to the increased effort and force needed to drive the saw through the wood.

One solution for the operator is to change chains, a process which requires not only a supply of extra chains, but proper tools and a suitable work surface. Typically, under field working conditions, this option is not exercised unless a chain breaks. More likely, the operator elects to perform a quick sharpening of the cutting teeth using an easily carried file.

There are various known methods for manually and automatically filing the chain saw. For manual filing, a person holds the file with his or her hand and files the cutting links of the chain of the chain saw. However, loosely holding the file may not be a desirable option as this may cause accidents. Moreover, automatic filing machines or devices are very expensive and may not be desirable too.

Therefore, in light of the foregoing, there is a need for an efficient, safe and reliable filing fixture that aides in manual filing of the chain of the chain saw.

SUMMARY

In view of the above, it is an objective of the present invention to solve or at least reduce the problems discussed above. In particular, the objective is to provide an improved fixture for filing a chain in a chain saw.

The objective is at least partially achieved according to a novel fixture configured to file a chain of a chain saw, as described in claim 1. The fixture includes a pair of flanges, each of the flanges having a first end and a second end. A first connecting portion connects the flanges at their first ends, and a second connecting portion connects the flanges at their second ends. The first connecting fixture includes at least a pair of counter holds, wherein the pair of counter holds are configured to provide area contact with a guide bar of the chain saw. Thus, the counter holds enable a tight and strong grip of the fixture onto the guide bar of the chain saw. Further, the fixture includes a cam portion pivotally connected to the second connecting portion. The cam portion and at least one of the counter holds simultaneously secure the fixture to the guide bar. This enables safe and reliable filing of various components of the chain.

According to claim 2, the first connecting portion is of a substantially triangular shape, the counter holds being provided on two edges. Such a configuration ensures that one counter hold contacts the guide bar when the fixture is mounted obliquely relative to the guide bar. Further, according to claim 3, the counter holds are integrally formed with the first connecting portion. Alternatively, according to claim 4, the counter holds are attached to the first connecting portion using at least one of riveting, welding, and bolting.

According to claim 5, the second connecting portion is of a substantially triangular shape, one edge including an indentation. The indentation enables the cam portion to extend beyond the edge of the second connecting portion and engage with the guide bar.

According to claim 6, the cam portion is extended to form a sheet metal guide. According to claim 7, the sheet metal guide includes multiple channels to engage multiple portions of the chain. Further, according to claim 8, the sheet metal guide includes at least one aperture which is shaped to enable filing of at least one depth gauge of the chain.

According to claim 9, each of the flanges includes at least one pair of recessed portions configured to engage a plurality of portions of the chain. At least two recessed portions of the flanges, at least one counter hold, and the cam portion simultaneously secure the fixture to the chain and guide bar. Thus, the fixture is secured at four positions.

According to claim 10, the fixture further includes a first rotatable cylindrical roller configured to be connected to the first end of each of the flanges, and a second rotatable cylindrical roller oriented substantially parallel to the first rotatable cylindrical roller, and connected to the second end of each of the flanges. The first and second rotatable cylindrical rollers are configured to support a file during filing.

BRIEF DESCRIPTION OF THE DRAWINGS

The invention will in the following be described in more detail with reference to the enclosed drawings, wherein.

DESCRIPTION OF EMBODIMENTS

Figure 1:
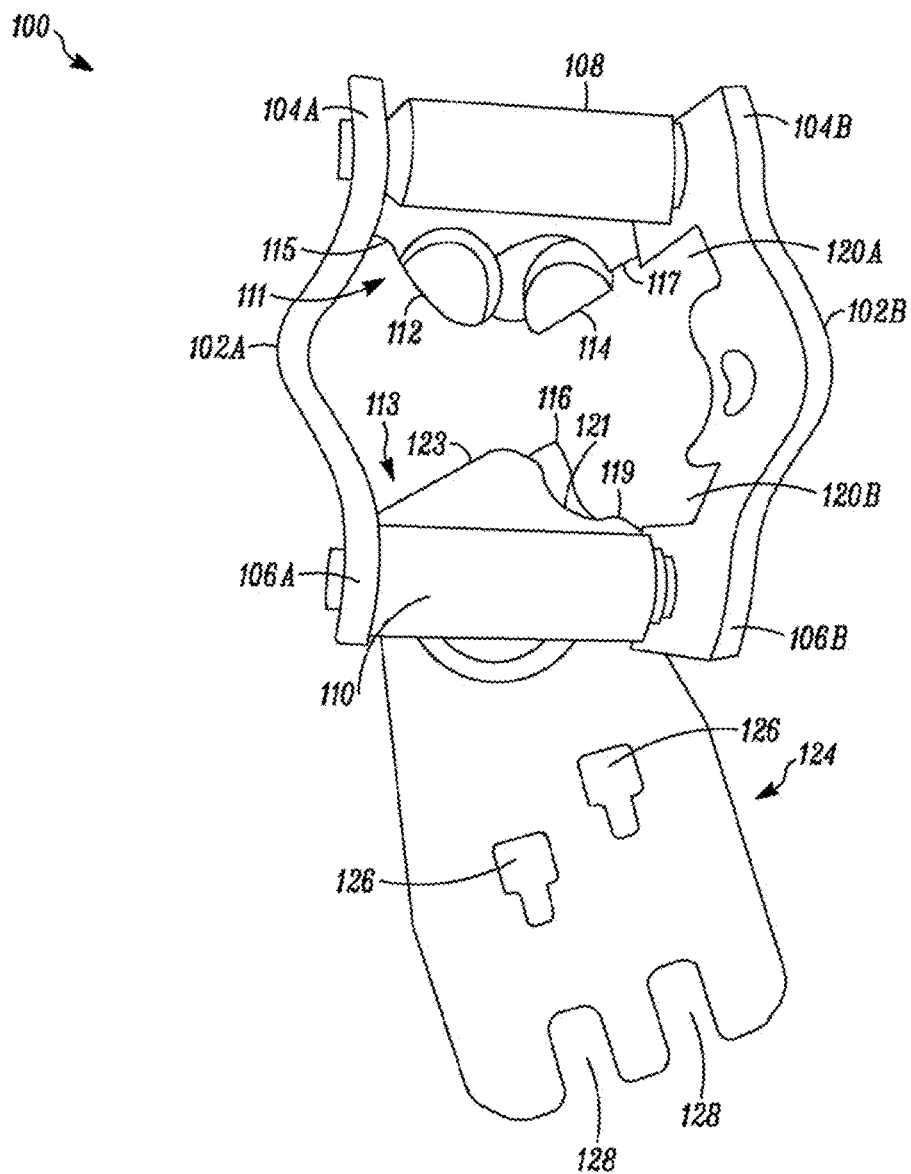
FIG. 1 illustrates a perspective view of a fixture for filing a chain of a chain saw, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

FIGS. 1-3B illustrate various views of a fixture 100 for aiding in filing of a chain of a chain saw. In one embodiment, the fixture 100 aides in manual filing of a cutting link of the chain of the chain saw. In a further embodiment, the fixture guide 100 aides in filing a depth gauge of the chain of the chain saw. The fixture 100 may be made of a plastic, any metal, metallic alloy, or composites. Further, the fixture 100 may be made by one or more suitable processes, for example, moulding, forming, machining, or the like.

A chain saw in general comprises a guide bar on which a chain is engaged. The chain includes various link components, such as a cutting link configured to cut a wood, a depth gauge configured to guide the depth of the cut desired for the chain saw, etc. The disclosure disclosed herein relates to a filing fixture guide 100 for filing the cutting link of the chain of the chain saw.

Figure 2:
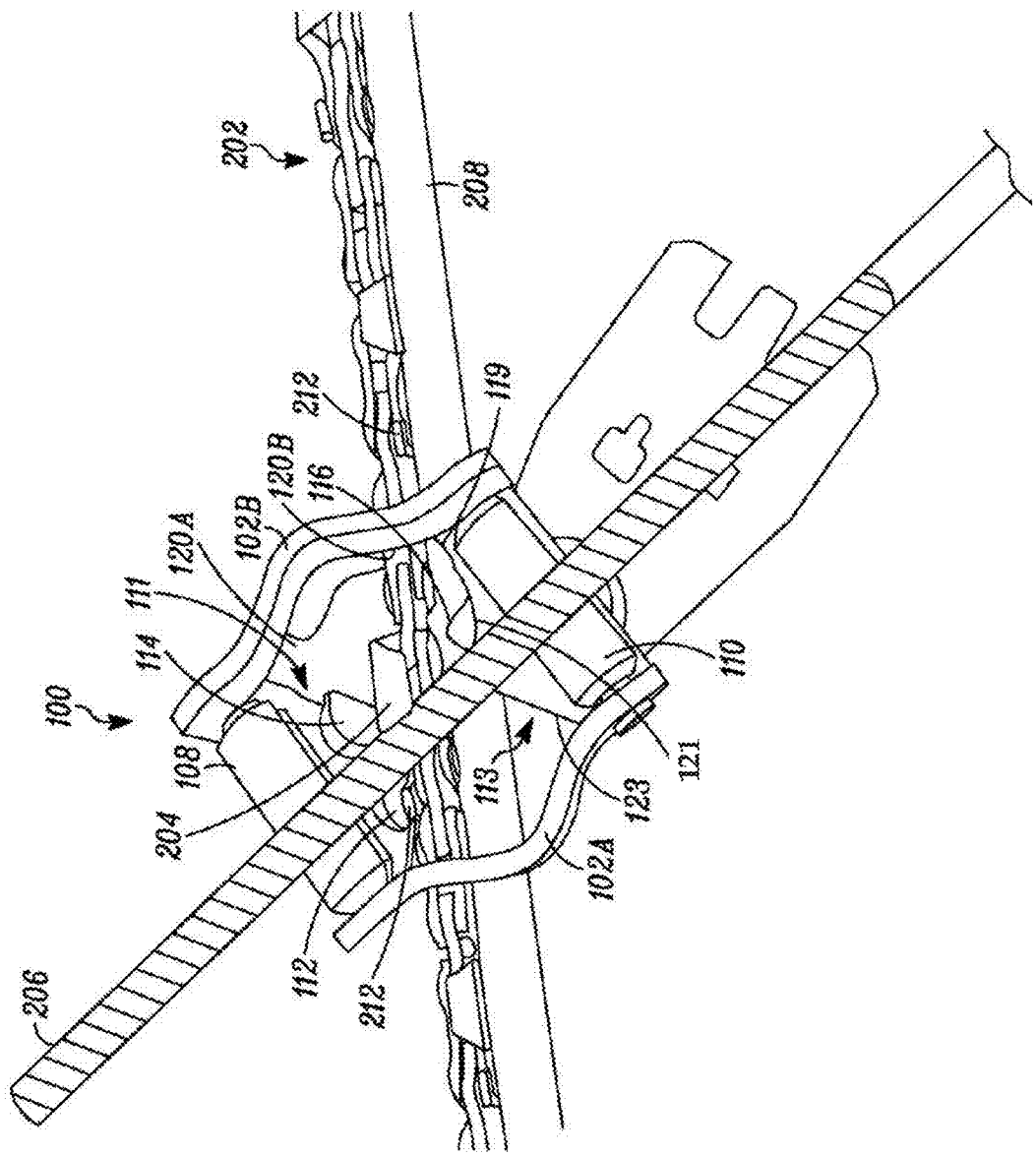
FIG. 2 illustrates a perspective view of the fixture mounted on a chain and a guide bar, according to an embodiment of the present invention.
Figure 3A:
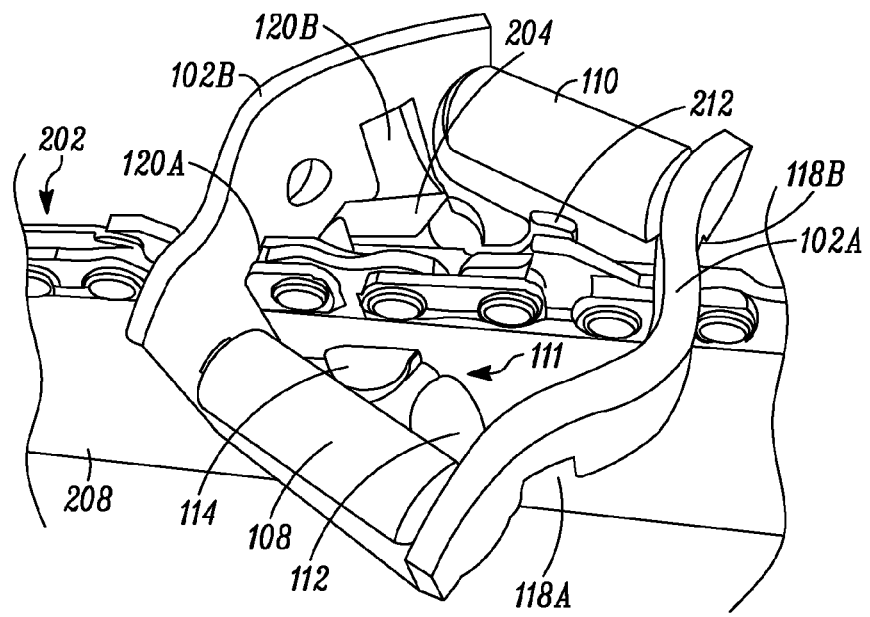
FIG. 3A illustrates a front perspective view of the fixture mounted on the chain and the guide bar in an alternative configuration, according to an embodiment of the present invention.
Figure 3B:
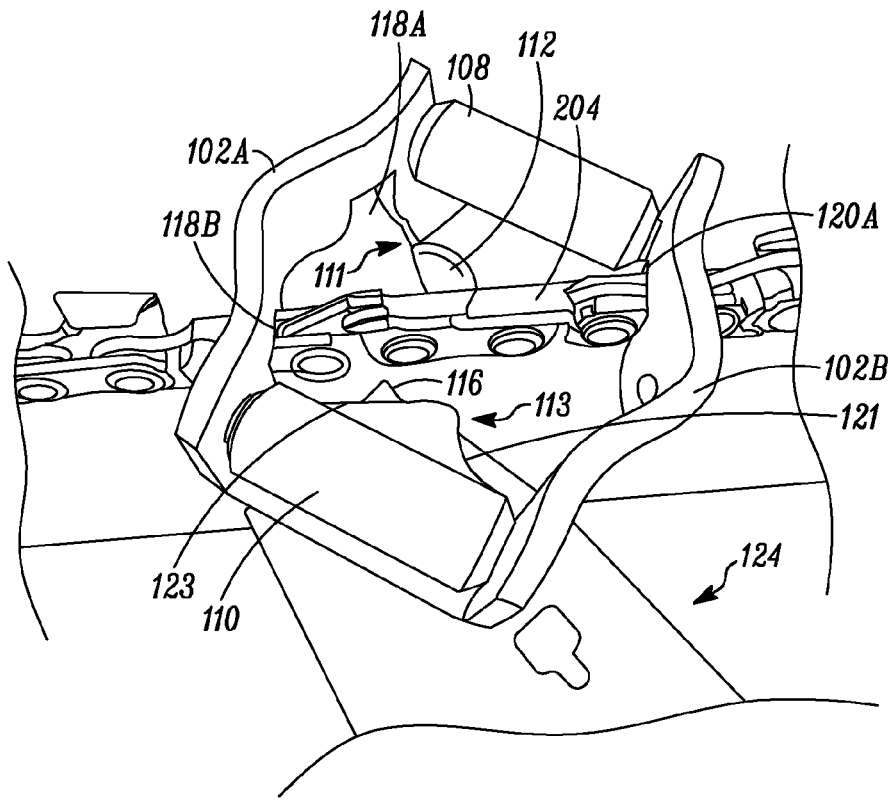
FIG. 3B illustrates a rear perspective view of the fixture mounted on the chain and the guide bar, according to the embodiment of FIG. 3A.

As illustrated in FIG. 1, the fixture 100 includes two flanges 102A and 102B (hereinafter collectively referred to as the flanges 102). The flanges 102 are placed substantially parallel to each other. Further, the flanges 102 include first ends 104A and 104B, respectively (hereinafter collectively referred to as the first ends 104). Moreover, the flanges 102 include second ends 106A and 106B, respectively (hereinafter collectively referred to as the second ends 106). The flanges 102 further include a plurality of recessed portions 118A and 118B (shown in FIGS. 3A and 3B) on the first flange 102A, and 120A and 120B on the second flange 102B. The recessed portions 118A, 118B, 120A and 120B are of shape such that a plurality of portions of a chain 202 may be engaged simultaneously with one or more of these recessed portions 118A, 118B, 120A and 120B, as illustrated in FIGS. 2, 3A and 3B. As will be understood by a person skilled in the art, the shapes of the recessed portions 118A, 118B, 120A and 120B are merely exemplary, and may be varied to achieve similar results.

The recessed portions 118A, 118B, 120A and 120B enable the fixture 100 to be fixed tightly onto the chain saw, and further guide a file 206 to achieve a correct angle for filing a cutting link 204 of the chain 202, as illustrated in FIG. 2. In one embodiment, the file 206 is a round file to enable easy grip of the file 206 and effective filing of the cutting link 204. As will be understood by a person skilled in the art, the shape of the file 206 is merely illustrative, and can be varied to achieve similar results.

As illustrated in FIG. 1, the fixture 100 includes a first rotatable cylindrical roller 108 connected to the first ends 104 of each of the flanges 102. Additionally, the fixture 100 includes a second rotatable cylindrical roller 110 connected to the second ends 106 of each of the flanges 102. Further, the second rotatable cylindrical roller 108 is placed substantially parallel to the first rotatable cylindrical roller 110. The rotatable cylindrical rollers 108 and 110 are configured to support the file 206 while filing the cutting link 204. The rotatable cylindrical rollers 108 and 110 rotate along the working direction of the file 206 while filing the cutting link 204. As will be understood by a person skilled in the art, the rollers 108 and 110 may be coupled with the flanges 102 using screws, rivets etc.

As illustrated in FIG. 1, a first connecting portion 111 and a second connecting portion 113 attach the flanges 102 at the first ends 104 and second ends 106, respectively. Further, the first connecting portion 111 includes a pair of counter holds 112 and 114. As illustrated in FIG. 1, the first connecting portion 111 has an approximately triangular shape with the counter holds 112 and 114 provided along two edges 115 and 117, respectively. Such a configuration ensures that one of the counter holds 112 and 114 contacts a guide bar 208 when the fixture 100 is mounted obliquely relative to the guide bar 208. However, the shape of the first connecting portion 111 is merely exemplary, and may be varied to achieve similar results. In one embodiment, the pair of counter holds 112 and 114 are configured to provide area contact with a guide bar 208 of the chain saw. As illustrated in FIG. 3B, the counter hold 114 contacts with a guide bar 208 to provide a tight grip of the fixture 100 onto the guide bar 208 of the chain saw. In one embodiment, the counter holds 112 and 114 have rectangular contacting surfaces. In various embodiments, the counter holds 112 and 114 may have a textured surface for improved gripping. However, it will be understood by a person skilled in the art, that the shape of the counter holds 112 and 114 is merely exemplary, and may be varied to achieve similar results. In one embodiment, the counter holds 112 and 114 are integrally formed with the first connecting portion 111. In an alternative embodiment, the counter holds 112 and 114 are attached to the first connecting portion 111 using at least one of welding, riveting, bolting etc. Moreover, the counter holds 112 and 114 may be integral with the first connecting portion 111, and made by stamping or moulding of the first connecting portion 111.

Further, the fixture 100 includes a cam portion 116 pivotally connected to the second connecting portion 113. The cam portion 116 is configured to secure the fixture 100 onto the guide bar 208. The cam portion 116 is twisted to contact the guide bar 208 to secure the fixture 100 between one of the counter holds 112 and 114, and the cam portion 116, onto the guide bar 208 of the chain saw, as illustrated in FIGS. 2, 3A and 3B. Further, the second connecting portion 113 is of a substantially triangular shape with an edge 119 including an indentation 121. The indentation 121 enables the cam portion 116 to extend beyond the edge 119 when the cam portion 116 is twisted to contact the guide bar 208, as illustrated in FIG. 2. Moreover, another edge 123 of the second connecting portion 113 is also dimensioned such that the cam portion 116 extends beyond the edge 123 in an alternate mounting configuration of the fixture 100, as illustrated in FIG. 3B. Thus, the second connecting portion 113 does not interfere with the operation of the cam portion 116. It will be understood by a person skilled in the art, that the shape of the second connecting portion 113 is merely exemplary, and may be varied to achieve similar results.

Further, the cam portion 116 may be extended to form a sheet metal guide 124 configured to enable manual filing of a depth gauge 212 of the chain 202 of the chain saw. In an alternate embodiment, the sheet metal guide 124 may be detachably connected to the cam portion 116 using screws, or rivets etc. However, the sheet metal guide 124 may include more than one cam portion which may be attached using other coupling mechanisms to achieve similar results. The cam portion 116 is illustrated as being protruding from the sheet metal guide 124 to a substantially triangular projection. However, in alternate embodiments, the cam portion 116 may include a curved portion (not shown) extending between the edges of the sheet metal guide 124. The sheet metal guide 124 includes one or more apertures 126 configured to receive the depth gauge 212 of the chain 202. In one embodiment, the shape of the apertures 126 is such that they are complementary with the shape of the depth gauge 212. As will be understood by a person skilled in the art, the shape of the apertures 126 in the sheet metal guide 124 are merely exemplary, and may be varied to achieve similar results. Moreover, the sheet metal guide 124 includes multiple channels 128 to engage a plurality of portions of the chain 202. This enables the sheet metal guide 124 to be secured during filing. Further, in other embodiments of the present invention, the cam portion 116 may be pivotally connected to the fixture 100 by a knuckle joint and made of a suitable material other than the material of the sheet metal guide 124.

For sharpening the chain 202, as illustrated in FIG. 2, the fixture 100 is mounted obliquely relative to the guide bar 208 such that the recessed portions 118A and 120B contact the chain 202. Further, the counter hold 112 contacts the guide bar 208. The cam portion 116 is then twisted to contact the guide bar 208 such the fixture 100 is locked to the guide bar 208 and the chain 202. Thus, the fixture 100 is held tightly onto the guide bar 208 and the chain 202 at four positions, namely, by the recessed portions 118A and 120B, the counter holds 112 and the cam portion 116. The file 206 may be then moved over the cylindrical rollers 108 and 110 to sharpen the cutting link 204 at an optimum angle. As the fixture remains stationary relative to the chain 202 and the guide bar 208 during the filing process, each cutting link 204 is sharpened uniformly and safely.

Alternatively, as illustrated in FIGS. 3A and 3B, the fixture 100 may also be placed obliquely relative to the guide bar 208 such that the recessed portions 118B and 120A contact the chain 202. Further, the counter hold 114 contacts the guide bar 208. In this orientation of the fixture 100, a cutting link 204 located on an opposite side, relative to the cutting link 204 in FIG. 2, may also be sharpened. As illustrated in FIG. 3A, in the secured position, the counter hold 114 maintains an area contact with the guide bar 208. Moreover, as illustrated in FIG. 3B, the cam portion 116 extends beyond the edge 123 of the second connecting portion 113. Thus, the fixture 100 is held tightly onto the guide bar 208 and the chain 202 at four positions, namely, by the recessed portions 118B and 120A, the counter hold 114 and the cam portion 116.

In the drawings and specification, there have been disclosed preferred embodiments and examples of the invention and, although specific terms are employed, they are used in a generic and descriptive sense only and not for the purpose of limitation of the scope of the invention being set forth in the following claims.

The invention claimed is:

1. A fixture for aiding the filing of a chain of a chain saw, said fixture comprising:
   at least one pair of flanges, wherein each of the flanges has a first end, a second end, and a plurality of recessed portions, wherein the plurality of recessed portions enable the fixture to be mounted obliquely relative to a guide bar of the chain saw;
   a first connecting portion connecting the first ends of each of the flanges and a second connecting portion connecting the second ends of each of the flanges, wherein the first connecting portion comprises at least a pair of counter holds, wherein the counter holds are configured to provide area contact with the guide bar of the chain saw; and
   a cam portion pivotally coupled to a bottom face of the second connecting portion by a coupling mechanism, wherein the cam portion is pivoted to contact the guide bar thereby securing the fixture onto the guide bar of the chain saw between one of the counter holds and the cam portion.

2. The fixture as claimed in claim 1, further comprising:
   a first rotatable cylindrical roller connected to the first end of each of the flanges; and
   a second rotatable cylindrical roller connected to the second end of each of the flanges and oriented substantially parallel to the first rotatable cylindrical roller, the first and second rotatable cylindrical rollers being configured to support a file during filing.

3. The fixture as claimed in claim 1, wherein the first connecting portion is of a substantially triangular shape and has a first edge and a second edge, wherein a first counter hold of the counter holds is provided on the first edge of the first connecting portion and a second counter hold of the counter holds is provided on the second edge of the first connecting portion.

4. The fixture as claimed in claim 1, wherein the counter holds are integrally formed with the first connecting portion.

5. The fixture as claimed in claim 1, wherein the second connecting portion is of a substantially triangular shape, and has a first edge and a second edge, wherein at least one of the first edge or the second edge comprises an indentation to enable the cam portion to extend beyond at least the first edge or the second edge when the cam portion is pivoted.

6. The fixture as claimed in claim 1, wherein the cam portion is an extension of a sheet metal guide.

7. The fixture as claimed in claim 6, wherein the sheet metal guide comprises a plurality of channels configured to engage a plurality of portions of the chain.

8. The fixture as claimed in claim 6, wherein the sheet metal guide comprises at least one aperture shaped to enable filing of at least one depth gauge of the chain.

* * * * *